United States Patent [19]

Pempek

[11] Patent Number: 4,729,552

[45] Date of Patent: Mar. 8, 1988

[54] VERTICAL VISE

[76] Inventor: George Pempek, 9740 S. 81st Ct., Palos Hills, Ill. 60465

[21] Appl. No.: 80,818

[22] Filed: Aug. 3, 1987

[51] Int. Cl.⁴ .................... B23Q 1/04

[52] U.S. Cl. .................... 269/71; 269/76; 269/156; 269/236; 269/239; 269/172; 269/82

[58] Field of Search .................... 269/71, 76, 156, 236, 269/239, 172, 17, 82

[56] References Cited

U.S. PATENT DOCUMENTS

| | | | |
|---|---|---|---|
| 2,491,972 | 12/1949 | Malote | 269/239 |
| 2,799,920 | 7/1957 | Hansen | 269/17 |
| 3,129,938 | 4/1964 | Riley | 269/236 |
| 4,206,910 | 6/1980 | Biesemeyer | 269/236 |
| 4,548,392 | 10/1985 | Rickling | 269/156 |

FOREIGN PATENT DOCUMENTS

| | | | |
|---|---|---|---|
| 335271 | 11/1903 | France | 269/239 |

*Primary Examiner*—Robert C. Watson

*Attorney, Agent, or Firm*—Lockwood, Alex, FitzGibbon & Cummings

[57] ABSTRACT

A vertical vise adaptable for floor mounting and having two spaced posts. One post carries a stationary work piece engaging jaw on its upper end and beneath the jaw, a vertically adjustable work piece support cradle assembly. The second post is hollow and shorter than the first post. A clamping head positioning arm is pivotally secured in the cavity of the second post so that its upper end is swingable toward and away from the first post. The second post carries a screw which projects thereinto for forcing the positioning arm toward the first post. The positioning arm projects above the second post and carries a clamping head assembly which includes a movable work piece engaging jaw mounted on a lever which is cam actuated. In use, a work piece is inserted between the posts with its bottom edge resting on the support cradle and its upper edge projecting above the clamping jaws. The screw is rotated so as to swing the positioning arm toward the first post and bring the movable clamping jaw almost into engagement with the work piece. Then the cam is rotated to its clamping position whereby the work piece is firmly clamped in the vise. The vise can usually be emptied and reloaded by actuation of the cam.

10 Claims, 4 Drawing Figures

VERTICAL VISE

This invention relates generally, to innovations and improvements in vertical vises, particularly vertical vises adapted to be mounted on the floor of a workshop. Vertical vises provided by the present invention are characterized by their capability of allowing elongated work pieces such as wooden boards to be securely clamped in a rapid fashion so that the exposed edges of the work piece or board can be worked on without the work piece or board becoming loose or slipping. In like manner, the work pieces can be readily removed and a different work piece inserted in rapid fashion.

The vertical vises of the present invention have an elongated fixed work piece engaging jaw mounted on or adjacent the top of an upright post which also carries a vertically adjustable cradle assembly which serves to support a work piece from the bottom while being firmly clamped in place. Further, vertical vises of the present invention have a movable work piece engaging clamp jaw carried by a clamping head assembly on the upper protruding end of a swingable clamp positioning arm. This arm is swingable toward and away from the first post by being disposed in the cavity of a second upright post which is hollow, with the arm being pivotally connected to the second post adjacent the bottom of its interior or cavity. The clamping head assembly includes a fast operating camming means which permit the movable clamp jaw to be quickly and conveniently forced into final clamping engagement against a work piece. A screw provided with a hand wheel or other manual rotating means is carried by the second post so that it can be rotated and bring its inner end into engagement with the positioning arm so as to force it into near clamping position wherein the fast-acting camming means can take over so that the work piece is securely held and the workman can proceed to perform an operation on the work piece without it slipping, tilting or otherwise coming loose.

From the foregoing it will be seen that a general object of the present invention is the provision of a new and improved vertical vise which is characterized in having the movable work piece engaging clamping jaw thereof actuated or operated by two different movements and two different mechanisms but with each mechanism including a pivotal arm. The first mechanism that brings the movable jaw close to engagement with the work piece on the opposite side thereof from the stationary jaw is a screw with the end of which engaging an elongated swingable arm. After the first near-clamping adjustment is made with the screw which can be manipulated by a hand wheel so that the movable clamp is within approximately ⅛ to a ¼ of an inch from the work piece, a cam actuated lever is manipulated which quickly forces the movable jaw into final clamping engagement with the work piece in a firm and secure fashion. The work piece can be readily removed by manipulating the cam actuated mechanism. If the next work piece to be inserted in the vise has the same or approximately the same thickness as that of the one that has just been removed, there is no need to adjust the screw since it will suffice to actuate the camming mechanism in order to secure the next work piece firmly in place.

An important object of the present invention is to provide a floor-mounted vertical vise which is readily produced from readily available materials and will be strong and rugged and capable of many years of frequent use.

Certain other objects of the invention will in part be obvious and will in part appear hereinafter in view of the following detailed description of a preferred embodiment taken in connection with the accompanying drawings in which.

Figure 2:
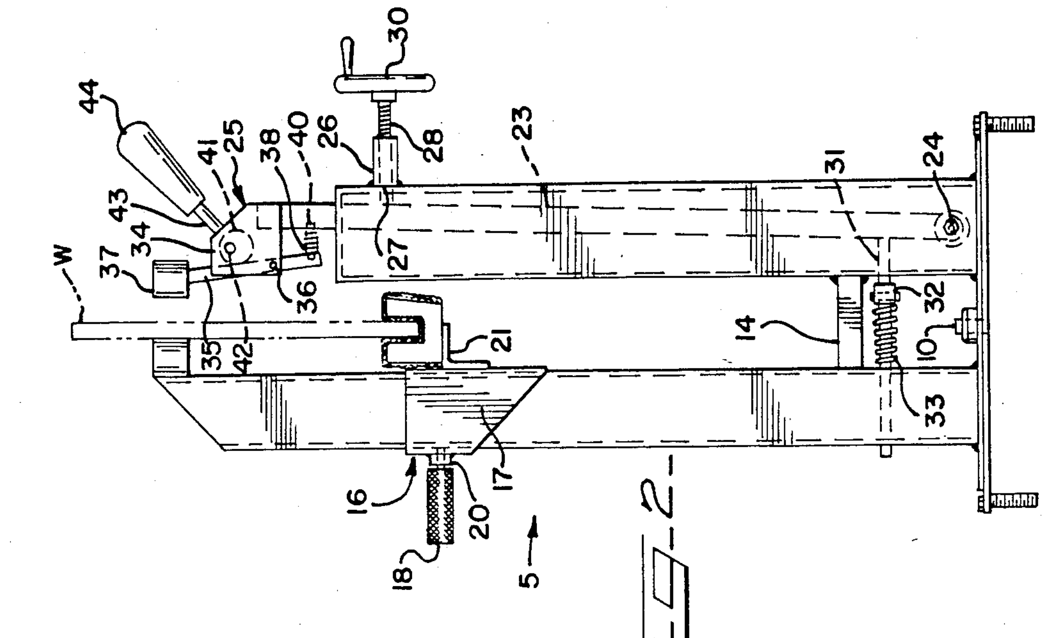
FIG. 2 is a side elevational view of the vertical vise shown in FIG. 1.

In the drawings the vertical vise is indicated generally at 5. The vise 5 is adapted to be mounted on the floor of a shop and to this end has a circular base 6 which may be anchored to a floor or other support by screws 7-7. The base of the vise 5 also includes a circular disk 8 which is rotatable on the base 6 and is secured in position thereon by a bolt 10 which projects upwardly through the rotatable disk 8 from the stationary support 6. The projecting end of the bolt 10 is provided with a clamping nut 11 which may be used to secure the rotatable disk 8, and thereby the vise 5, in any desired position with respect to the plate 6 and the floor to which it is secured. Two upright posts 12 and 13 are mounted on the disk 8. The posts 12 and 13 may be interconnected by one or more struts 14 (FIG. 2) so as to resist the tendency of the posts to be forced apart in use. The posts 12 and 13 may take several different forms, a suitable one being hollow and rectangular in cross-section.

The post 12 is taller than post 13 and has secured on the upper end thereof an elongated fixed or stationary clamping jaw 15. A work piece support cradle assembly indicated generally at 16, is vertically adjustable on the post 12. The assembly 16 comprises a sleeve member 17 which slidably fits over the post 12. The sleeve member 12 can be secured in any desired position of height on the post 12 by means of a screw 18, the threaded end of which passes through a nut 20 secured on the sleeve 17 and the threaded bore of which is aligned with an aperture in the sleeve 17 so as to allow the inner end of the screw 18 to engage the adjacent side of the post 12.

Figure 1:
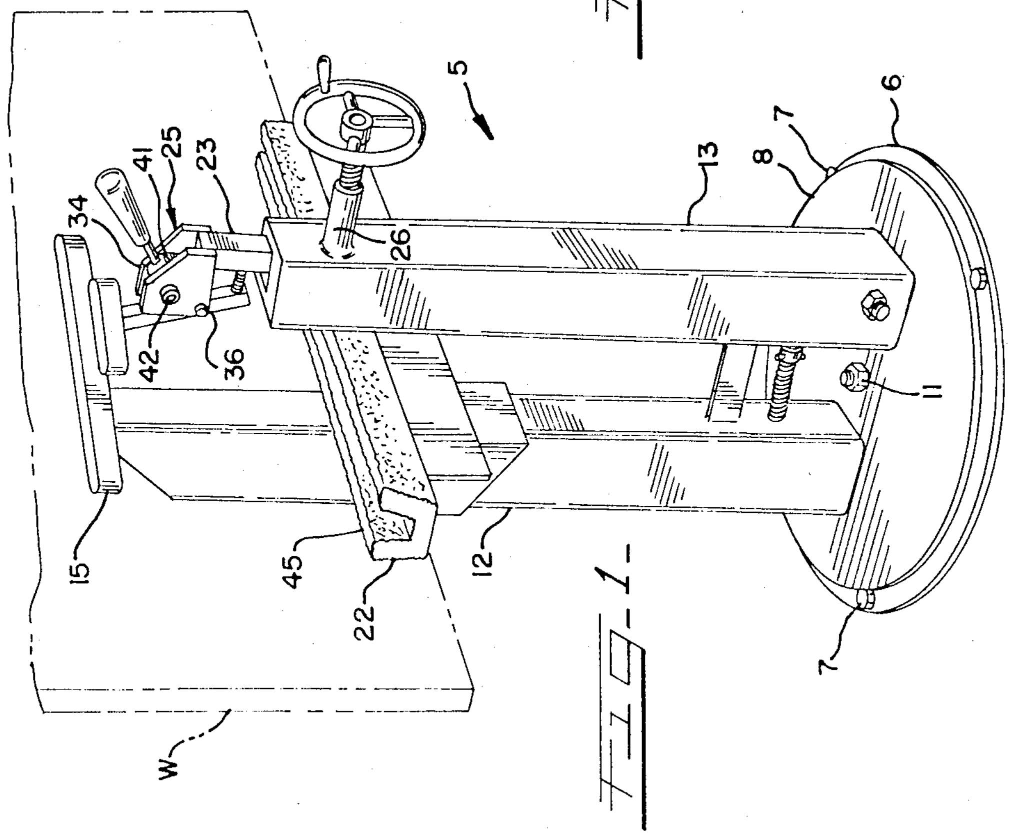
FIG. 1 is a perspective view of a floor-mounted vertical vise embodying the present invention.
Figure 4:
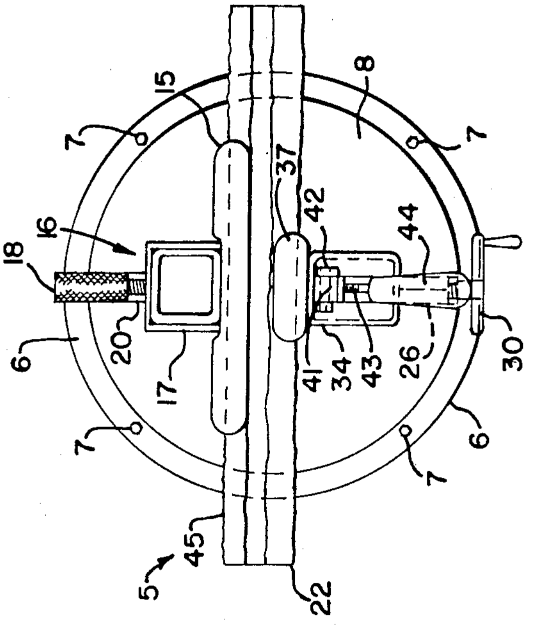
FIG. 4 is a top plan view.
Figure 3:
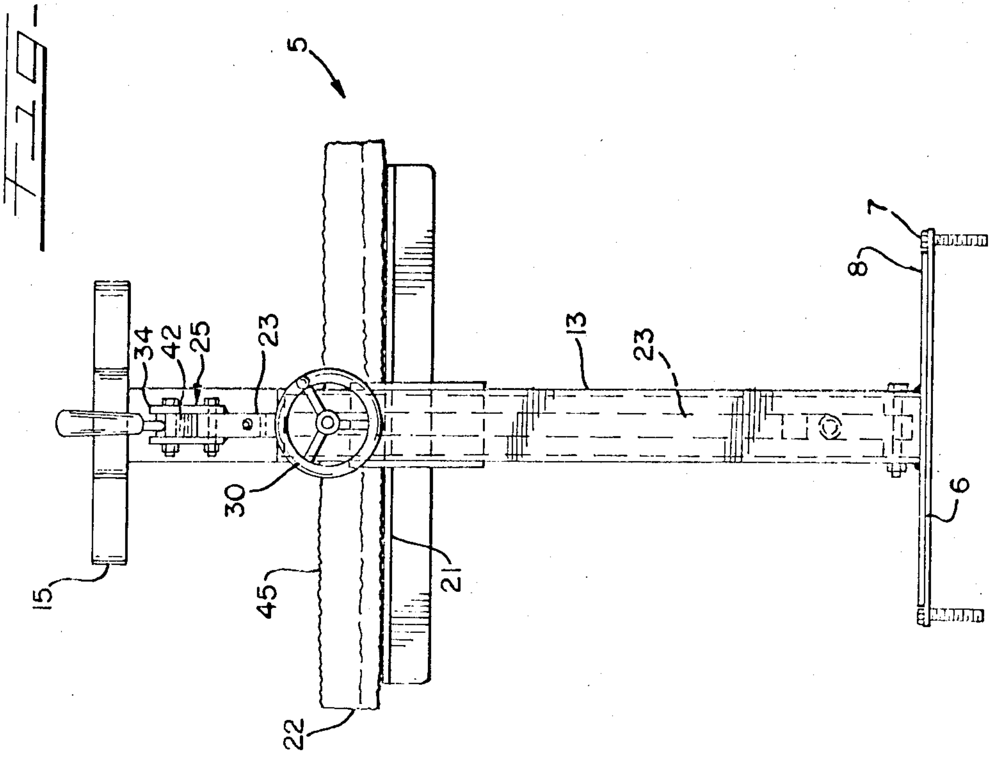
FIG. 3 is a side elevational view on line 3—3 of FIG. 2.

The sleeve 17 is provided with a bracket or shelf 21 on the side thereof which faces the post 13. The shelf 21 serves as a support for a removable trough-like member 22 for receiving the bottom edge of a work piece such as the one shown in broken lines in FIGS. 1 and 2 and designated by the letter W.

In the hollow cavity of post 13, a clamping head positioning arm 23 is disposed with the bottom end of the arm 23 pivotally connected at 24 to the post 13 adjacent the bottom thereof. The upper end of the arm 23 projects above the top of the post 13 and has mounted thereon a clamping head assembly indicated generally a 25.

Adjacent its upper end, and on the side thereof away from the post 12, the post 13 is provided with a threaded sleeve or nut 26 the threaded bore of which is aligned with an aperture 27 (FIG. 2) in the sidewall of the post. A screw 28 extends through the threaded sleeve or nut 26 and carries on its outer end a hand wheel 30. It will be seen that upon rotating the screw 28 so that it enters the post 13 the inner end of the screw 28 will engage the arm 23 and cause the arm to swing toward the post 12. Conversely, upon rotating the screw 28 so as to back it out of the post 13 the arm 23 will be free to swing in the post 13. It is desired to normally maintain the arm 23 in engagement with the end of screw 28. This is accomplished by providing a spring actuated pin 31 (FIG. 2) which projects through the inner sidewall of the post 13 and the inner end of which engages the arm 23 on the side thereof opposite of which it is engaged by the screw 28. The pin 31 extends through the post 12 for support and carries a collar 32. The collar 32 is engaged by one end of a compression spring 33 which is maintained in compression between the collar 32 and the post 12.

The clamping head assembly 25 which is mounted on the upper end of the positioning arm 23 comprises a fitting 34 which is fabricated from two vertical plates and securely attached to the upper end of the arm 23 as by welding or clamping. The clamping head assembly 25 carries a lever or arm 35 which is pivotally connected intermediate its ends by means of a pin 36 between the plates forming the fitting 34. At its upper end the lever 35 carries a movable clamping jaw 37 which opposes the stationary jaw 15. The lower end of the lever 35 is engaged by a compression spring 38 which fits over a pin 40 so as to normally bias or force the lower end of the lever arm 35 away from arm 23 and maintain the jaw 37 in its retracted position. The movement of the lower end of lever 35 away from the arm 23 is limited by the lever 35 engaging a fixed portion of the fitting 34.

In use of the vise 5, the movable jaw 37 is brought into final and full clamping engagement against a work piece W by means of a rotatable cam 41 in the form of a disk or circular block which is eccentrically mounted between the plates of the fitting 34 on a pin 42. The cam 41 is rotated by a lever 43 projecting therefrom, the outer end of which is provided with a suitable handle 44.

After describing the normal operation of the vise 55, certain unique advantages thereof will be pointed out which are attributable to its construction as shown and described.

In use, depending upon the particular type of work piece W involved, a trough member 22 suitable to that work piece is placed on the shelf 21. The member 22 should have a groove which will comfortably accommodate the width of the lower edge of the work piece W. If the work piece is wood or plastic it is desirable to have the member 22 covered or lined with a suitable fabric material as indicated at 45 and the member 22 may be formed of any suitable rigid material such as wood, plastic or metal. If the work piece W is a piece of glass plate, it is desirable that the member 22 be lined with a piece of rubber. If the work piece W is formed of metal, then it is desirable to use a support or trough member 22 formed of metal without any lining.

Having placed the member 22 on the shelf 21, the set screw 18 is manipulated so as to loosen its engagement with the post 12 and allow the work piece cradle assembly 16 to be positioned upwardly or downwardly on the post 12 so that the upper edge of the work piece W will project at an appropriate height above the jaws 15 and 37. The assembly 16 is then clamped into position by tightening the screw 18 so as to lock the sleeve 17 in its desired position on the post 12.

With the work piece W resting in its position in the vise as shown in FIG. 2, the operator advances the screw 28 by turning the hand wheel 30 so as swing the arm 23 toward the post 12 and advance the movable jaw 37 toward the work piece W. This advancement of the jaw 37 is discontinued when it is approximately $\frac{1}{8}$–$\frac{1}{4}$ of an inch away from engaging the work piece W. Thereupon the handle 44 on the lever 43 is rotated downwardly whereupon the eccentrically mounted cam 41 forces the lever 35 to tilt or swing toward the work piece and thereby force the movable jaw 37 into final clamping engagement with the work piece W. After the operator or workman has performed whatever operation is desired on the work piece W while it is firmly clamped in the vise 5, the operator then raises the handle 44 which produces a rotation of the cam 41 which allows the jaw 37 to swing away from the work piece W under the action of the compression spring 38. The work piece W is now free to be removed.

If after performing a desired operation on one work piece W and removing the same from the vise 5 it is desired to perform an operation on a work piece of similar thickness and dimensions, it is merely necessary to insert the new work piece into the vise and manipulate the handle 44 as previously described. On the other hand, if a work piece of a different size, thickness or dimensions is to be inserted in the vise it may be necessary to raise or lower the cradle support assembly 16 and to readjust the position of the arm 23 by resetting the screw 28.

While in normal usage following the procedure described above the operation of the clamping assembly 25 and the clamping engaging force provided by the eccentric cam 41 will provide adequate clamping force for the work piece, there may be occasions when additional clamping force is desired and this can be readily obtained by further advancing the screw 28 after operation of the assembly 25. It will be seen that with the screw 28 engaging the arm 23 at a substantial distance above the pivot 24 and with the clamping jaw 37 being positioned above the screw 28 at an appreciably shorter distance, the action of the screw 28 on the arm 23 provides a substantial mechanical advantage, e.g. 3 to 1.

By having the relatively long arm 23 pivotally anchored in the bottom of the post 13 and having it fully supported from opposite sides during its swinging movement, the effects of twisting and sidewise bending forces that may be exerted on the arm 23 are minimized or eliminated.

What is claimed is:

1. A vertical vise comprising, in combination, a first rigid upright post, a second rigid upright post spaced from said first post, said second post being shorter than said first post, having an elongated vertically extending longitudinal cavity therein which is open at the top, and having an aperture therein which opens into said cavity from the side thereof furthest away from said first post, a clamping head supporting and positioning arm disposed in said cavity with the lower end of said arm pivotally connected to said second post whereby said arm is swingable in said cavity toward and away from said first post, the upper end of said arm projecting above the upper end of said second post, work piece support means mounted on said first post and having a work piece support shelf-like portion projecting from the side of said first post nearest to said second post, a first work piece engaging jaw mounted on said first post at or adjacent its upper end on the side thereof nearest to said second post, stationary nut means mounted on said second post with the bore of said nut in alignment with said aperture, a screw extending through said aperture and nut means in threaded engagement therewith with the inner end of said screw being engageable with said arm, and clamping head means including a head fitting mounted on the upper end of said arm, a second work piece engaging jaw mounted on a first lever which is pivotally mounted on said head fitting whereby said second jaw is swingable toward and away from said first jaw, a second lever pivotally mounted adjacent one end on said head fitting, a cam mounted on said pivoted end of said second lever and engaging the side of said first lever furthest away from said first post whereby on swinging said second lever said first lever may be releasably forced by said cam to swing toward said first post and said second jaw thereby releasably forced toward said first jaw and into clamping engagement with a work piece disposed between said jaws.

2. In the vertical vise called for in claim 1, a floor-mounted rotatable plate, and said first and second upright posts being secured at their bottom ends to said plate.

3. In the vertical vise called for in claim 1, said work piece support means comprising a sleeve vertically slidable on said first rigid upright post, and a set screw carried by said sleeve and engageable with said first rigid upright post.

4. In the vertical vise called for in claim 1, said clamping head supporting and positioning arm being pivoted to said second rigid upright post adjacent the lower end of said arm and adjacent the bottom of said cavity.

5. In the vertical vise called for in claim 4, the distance between said pivot connection of clamping head supporting and positioning arm to said second rigid upright post and the place of said engagement of said inner end of said screw with said arm being substantially greater than the distance between said place of engagement and said second work piece engaging jaw.

6. In the vertical vise called for in claim 5, said first-mentioned distance being at least about twice said second-mentioned distance.

7. In the vertical vise called for in claim 1, said cam being a cylinder eccentrically mounted on said pivoted end of said second lever.

8. In the vertical vise called for in claim 1, spring means operatively connected with said clamping head, supporting and positioning arm and biasing said arm away from said first rigid upright post.

9. In the vertical vise call for in claim 8, said spring means comprising a pin engaging the lower end of said clamping head supporting and positioning arm on the side thereof facing said first rigid upright post, and compression spring means actuating said pin and biasing said arm away from said first rigid upright post.

10. In the vertical vise called for in claim 1, spring means operatively connected with said first lever and biasing said second work piece engaging jaw away from said first work piece engaging jaw.

* * * * *